United States Patent [19]
Dato et al.

[11] 3,708,051
[45] Jan. 2, 1973

[54] CONTROL MECHANISM FOR ADVANCING AND LOCATING PALLETS

[75] Inventors: Anthony L. Dato, River Vale; Zoltan E. Zilahy, Nutley, both of N.J.

[73] Assignee: Standard Tool & Manufacturing Co.

[22] Filed: March 26, 1971

[21] Appl. No.: 128,305

[52] U.S. Cl. .................................................198/19
[51] Int. Cl. ........................................B23q 5/22
[58] Field of Search........................................198/19

[56] References Cited

UNITED STATES PATENTS

| 2,856,054 | 10/1958 | Fausset | 198/19 |
| 1,856,733 | 5/1932 | Shepherd | 198/19 X |
| 2,249,230 | 7/1941 | Schafer | 198/19 |

Primary Examiner—Richard E. Aegerter
Assistant Examiner—Douglas D. Watts
Attorney—Harness, Dickey & Pierce

[57] ABSTRACT

Carriers are mounted on vertical rails having a wear plate on the bottom which rests upon wear plates on a continuous chain which drives the carriers from one machine station to another where one or a group of carriers may be retained stationary as the chain continues to advance. A reciprocal control mechanism engages the wear plate of a carrier and advances it to a station where the pallet carried thereby is accurately oriented and clamped during a machining operation. The clamped pallet prevents the carrier advancement and permits the reciprocal control mechanism to be released therefrom. An escapement mechanism permits one carrier at a time to be advanced to the reciprocal control mechanism which advances the carrier or carriers to the next adjacent station or stations.

14 Claims, 11 Drawing Figures

CONTROL MECHANISM FOR ADVANCING AND LOCATING PALLETS

BACKGROUND OF THE INVENTION

Reference may be had to D. A. Cargill Reissue U.S. Pat. No. 25,886 to show the state of the art of pallets which when stopped permit the drive chain to continue to advance.

RELATED APPLICATION

Reference may be had to the application of Zoltan E. Zilahy et al., Ser. No. 33,440, filed Apr. 30, 1970, for "MACHINE HAVING OVERHANG SUPPORTS FOR PALLETS" which was assigned to the assignee of the present invention.

SUMMARY OF THE INVENTION

The invention pertains to a support having vertical rails on which carriers are mounted for movement therealong in a continuous variable loop path. The carriers have a wear plate on the bottom which rests upon the wear plates on the top of a single strand hollow pin conveyor chain made up of segments which hinge in a horizontal plane. Each carrier has a pair of rollers which engage the rear side of a vertical top rail and a pair of eccentrically mounted rollers at the bottom which engage the front side of a vertical bottom rail, the bottom rollers being adjustable to retain the top face of the carrier in a horizontal plane. The carriers have shock absorbing mechanism thereon which permits one carrier to advance and engage a stopped carrier without shock and noise normally resulting therefrom.

An escapement mechanism is provided which retains a carrier ahead of a machine station where a reciprocal control mechanism engages the carrier wear plate and positively advances the carrier into the station. An orientation mechanism at the station raises the pallet from the carrier and accurately locates the pallet as it is clamped in fixed position. The clamped pallet retains the carrier from advancing so that a link in engagement with the forward end of the carrier wear plate can be released to permit the reciprocal control mechanism to be returned to its initial position where it will engage the wear plate of the next adjacent carrier delivered by the escapement mechanism.

A drive is provided which rotates a disc through a single or one-half revolution clutch which advances and retracts the reciprocal control mechanism, operates the escapement mechanism and positions the wear plate engaging link on the reciprocal control mechanism. The drive also operates a one-half revolution clutch which reciprocates a mechanism which clamps and releases the pallet at a station. Several carriers may abut each other ahead of the escapement mechanism which will retain them stationary while permitting the advancement of a single carrier by the reciprocal control mechanism which moves the carrier to the machine stations. At the same time the carrier in the machine station can be advanced to the next adjacent machine station by a modified reciprocal mechanism which engages both carriers. Any delay at a station will not affect the machining operations at the other stations. The forwardmost carrier of the group retained by the escapement mechanism will be released and advanced to the station when the carrier within the station is advanced by the chain wear plates when the pallet thereon is released at the station. The escapement mechanism and the reciprocal control mechanism is so constructed that they can be rendered inoperative to permit the carriers to directly advance to the stations where other carriers may be accumulated when the work to be performed at a station is delayed.

BRIEF DESCRIPTION OF THE DRAWINGS

FIG. 6 is a view of the structure illustrated in FIG. 5, as viewed from the point 6 thereof;

DESCRIPTION OF THE PREFERRED EMBODIMENTS

Figure 1:
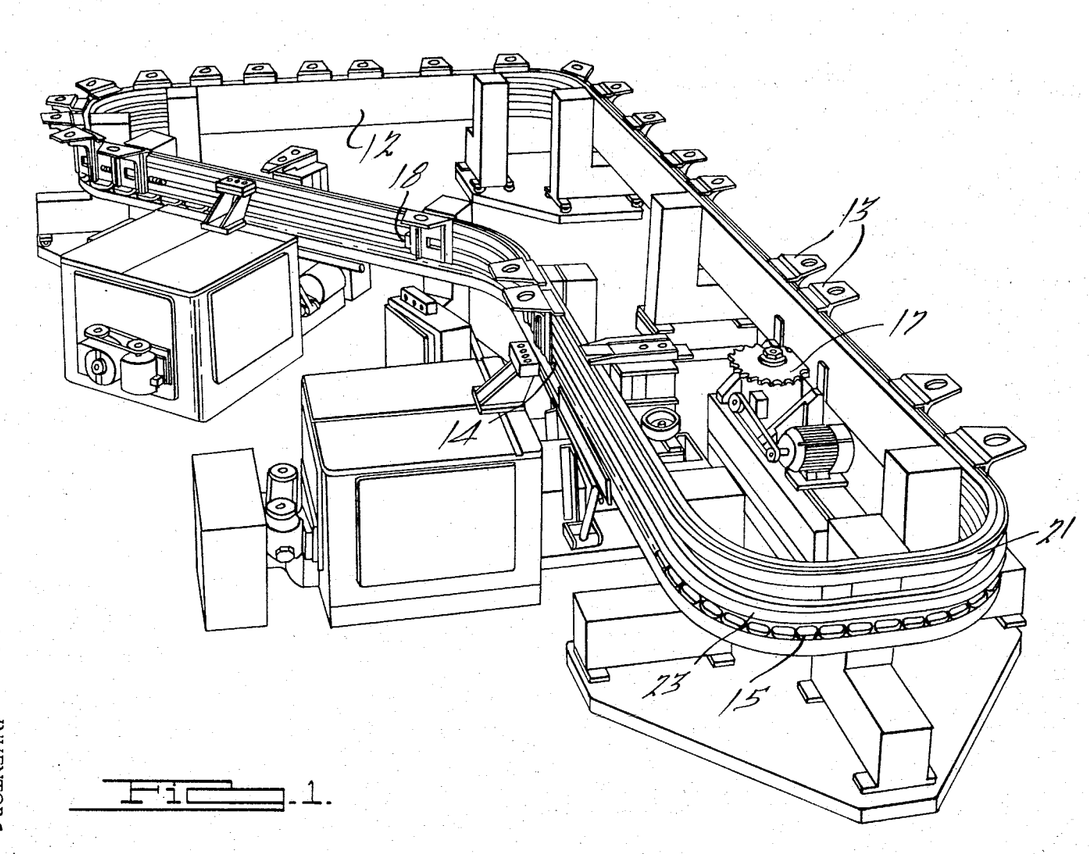
FIG. 1 is a perspective view of a non-synchronous pallet advancing machine embodying features of the present invention.

The machine 11 illustrated in FIG. 1 is somewhat similar to the machine of the above mentioned copending application. The machine has a looped undulated vertical support 12 on which a plurality of free carriers 13 are mounted on the vertical rails 21 and 23 thereon for non-synchronous movement therealong. Each carrier 13 has a wear plate 14 on the bottom which engages wear plates 15 on a chain 16 which is continuously driven by a sprocket 17. The carriers have shock absorbing mechanism 18 thereon which cushions the engagement between the carriers and substantially eliminates impact noise. It is to be understood that mechanism could be employed for operating a brake for controlling the advancement of the carrier as in the above mentioned copending application, if this should be desired. The carrier has a pair of rollers 19 at the top which engages the rail 21 and a pair of eccentrically mounted rollers 22 which engages the rail 23 at the bottom which are adjustable to maintain the top face 24 of the carrier in a horizontal plane. A pair of rollers 25 on the carrier engage the bottom face of the rail 21 to aid in the control of the carrier as it is moved along the rails by the chain drive.

Figure 8:
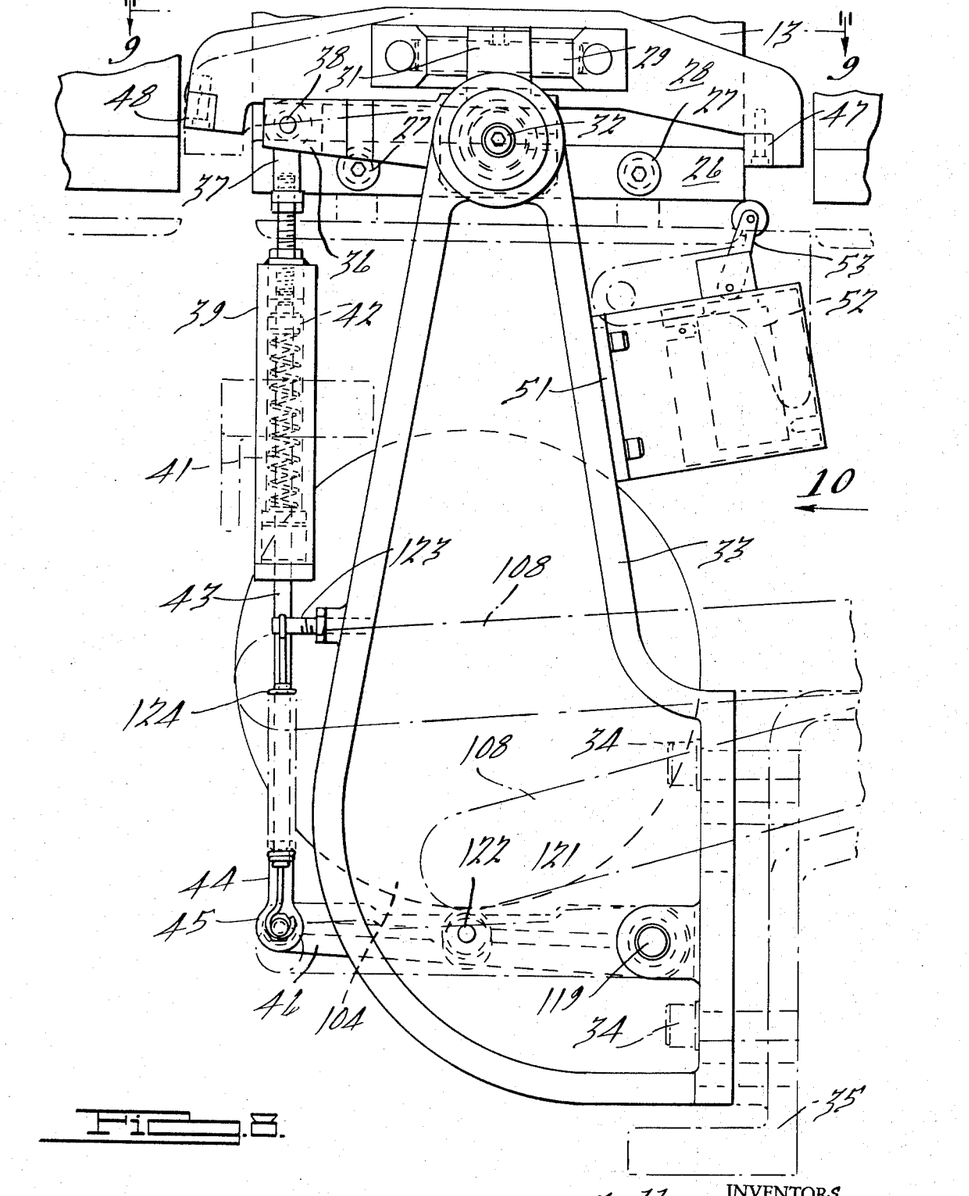
FIG. 8 is a view of the structure illustrated in FIG. 2 with the escapement mechanism added thereto.
Figure 9:
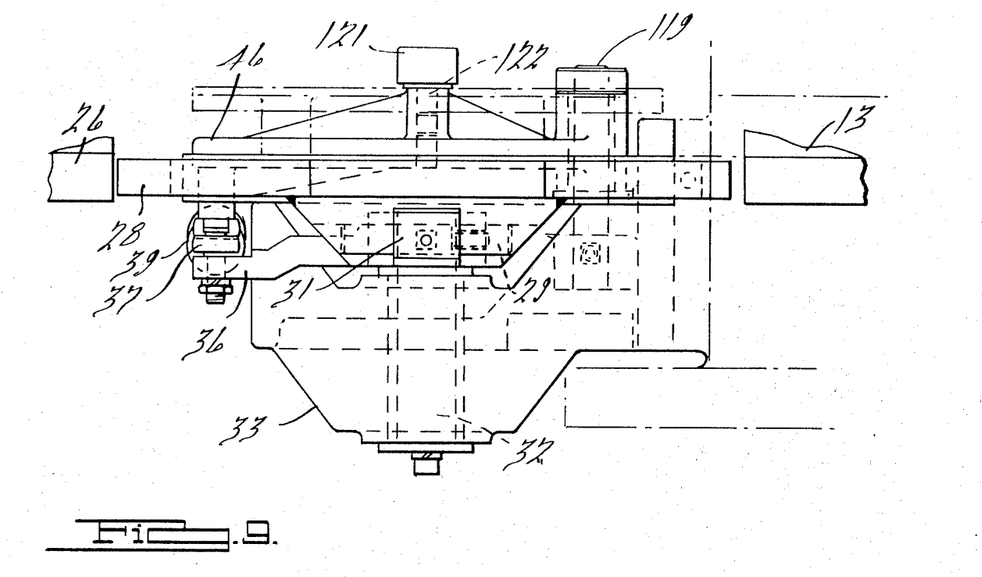
FIG. 9 is a plan view of the structure illustrated in FIG. 8, as viewed from the line 9—9 thereof.
Figure 10:
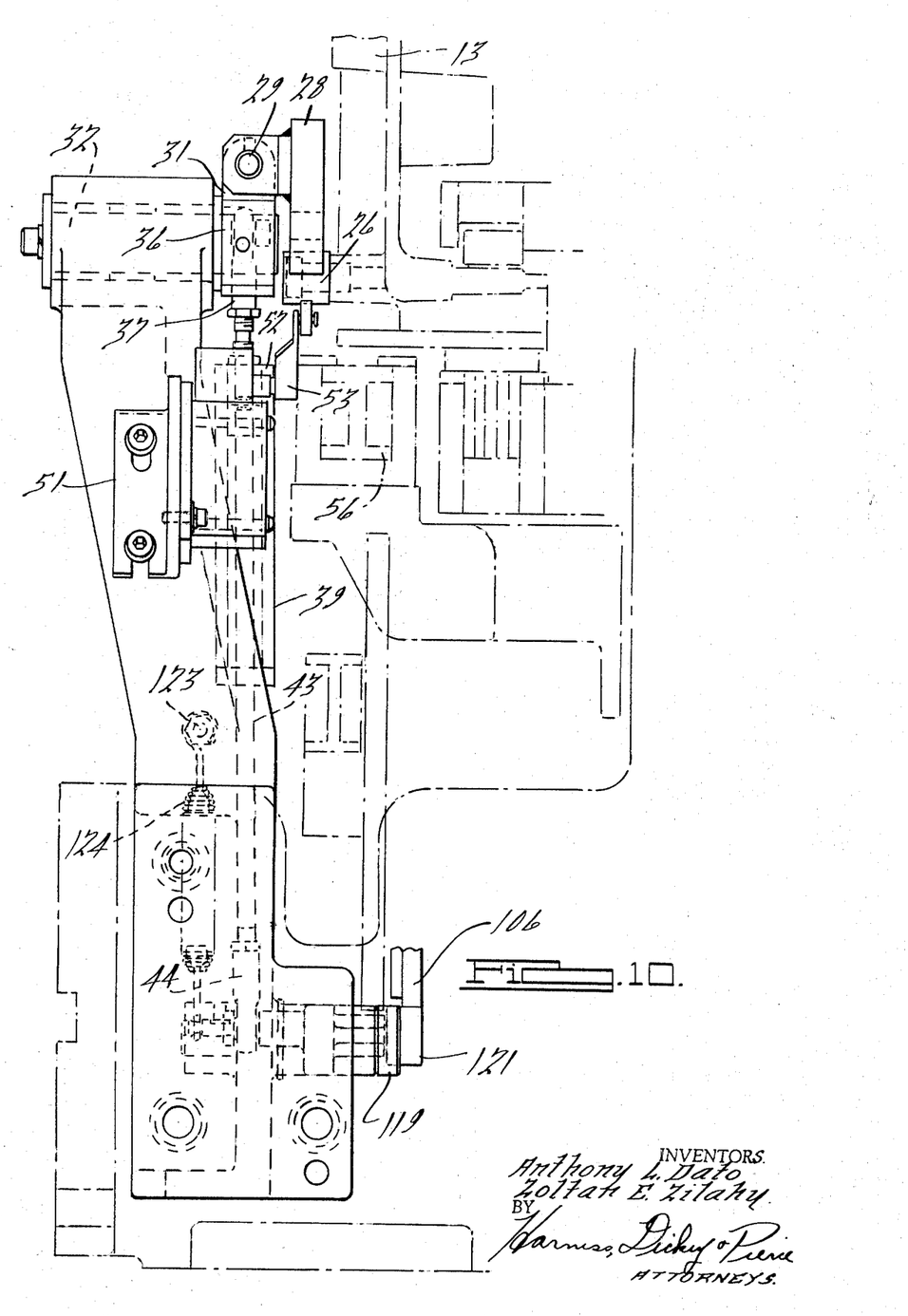
FIG. 10 is a view of the structure illustrated in FIG. 8, as viewed from the point 10 thereof.

The carriers 13, as illustrated in FIGS. 8 and 9, have a bar 26 on the bottom of the front face secured thereon by screws 27. An escapement mechanism has a walking beam 28 secured by a hinge pin 29 to a block 31 which is mounted on a pivot 32 at the top of a supporting bracket 33 which is secured by screws 34 to the base 35 of the machine. An arm 36 on the block 31 is secured to one end of a connecting rod 37 having ball ends 44, the other end of which is connected by a pivot 45 to the end of a cam-operated arm 46. The ends of the walking beam 28 have stop blocks 47 and 48 secured thereto against which the forward end of the bars 26 abut as the carriers 13 are advanced seriatim. The supporting bracket 33 has a bracket 51 adjustably mounted thereon for supporting a control switch 52 having an operating arm 53 which is engaged by the bar 26 as it advances. Oscillation of the walking beam 28 permit the advancement of a single carrier to locate the wear plate 14 thereon relative to a reciprocal mechanism 54, as more clearly illustrated in FIG. 2. As illustrated in the Figure, the walking beam 28 retains a carrier in the position at which a wear plate 14 thereof is located at the point 55 ahead of a machine station.

Figure 2:
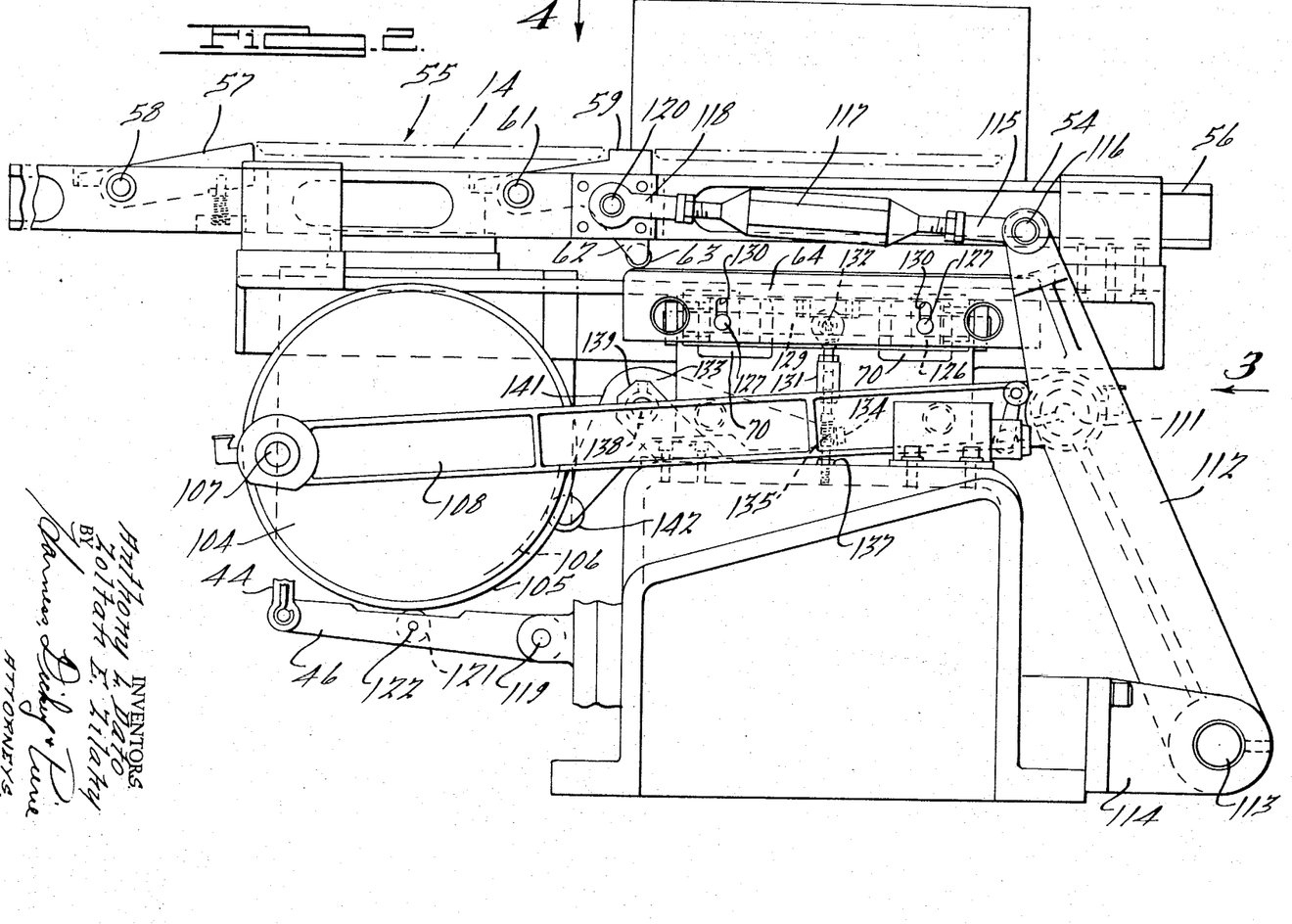
FIG. 2 is an enlarged broken view of the reciprocal control mechanism of the machine illustrated in FIG. 1.
Figure 11:
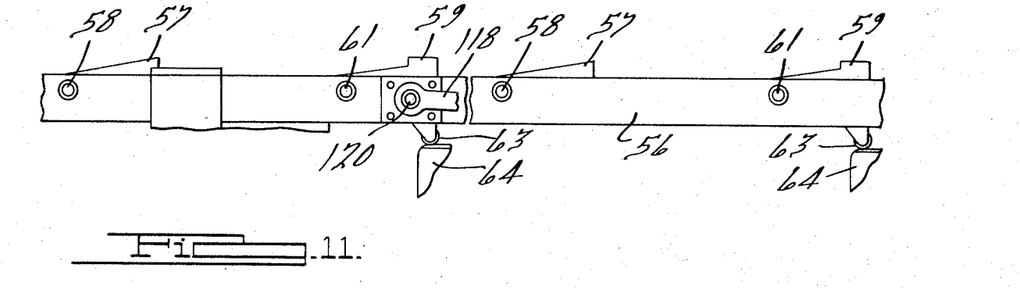
FIG. 11 is a view of structure, similar to that illustrated in FIG. 2, showing another form thereof.

The movement of a reciprocal shuttle bar 56 to the left permits a spring pressed link 57 mounted on a pin 58 to engage the lefthand end of the wear plate 14 of the carrier. A link 59 pivoted on a pin 61 on the shuttle bar 56 is moved into a position of engagement with the righthand end of the wear plate 14. This occurs when a roller 63 on an angularly disposed arm 62 on the link 59 engages a bar 64 which is secured by a shaft 65 in hinged relation to a fixed plate 66. Before the shuttle bar 56 is moved to the left, the bar 64 is dropped downwardly to release the link 59 from the forward end of the wear plate 14 after the carrier has been retained in the station by the clamped pallet to permit the shuttle bar 56 to return and engage the next adjacent wear plate 14 on the carrier located at the point 55. In this manner, a carrier is held by the escapement mechanism in position adjacent to a machine station until its wear plate is engaged by the links 57 and 59 of the returned shuttle bar 56 after which it is released by the escapement mechanism and advanced to the station by the reciprocal control mechanism. The pallet is oriented and clamped in the station before the machine operation, as will be explained hereinafter. It is to be understood that when two stations are adjacently disposed, the shuttle bar 56 will be provided with spaced sets of links 57 and 59, as illustrated in FIG. 11, so that when the carrier is moved into the first station the carrier therein will be positively advanced to the next adjacent station.

Figure 5:
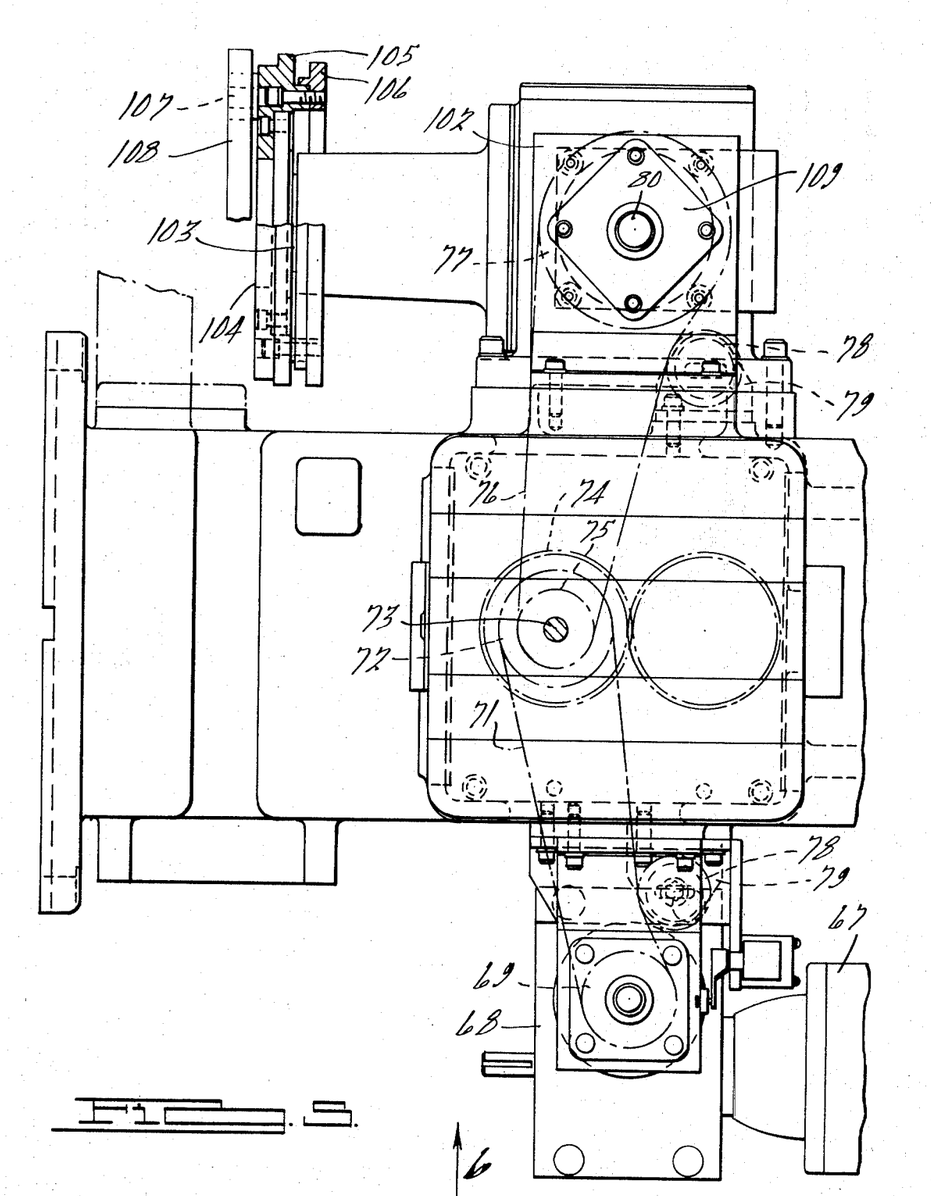
FIG. 5 is a horizontal view with parts in section of the drive mechanism for operating the elements for controlling the position and advancement of the carriers.
Figure 7:
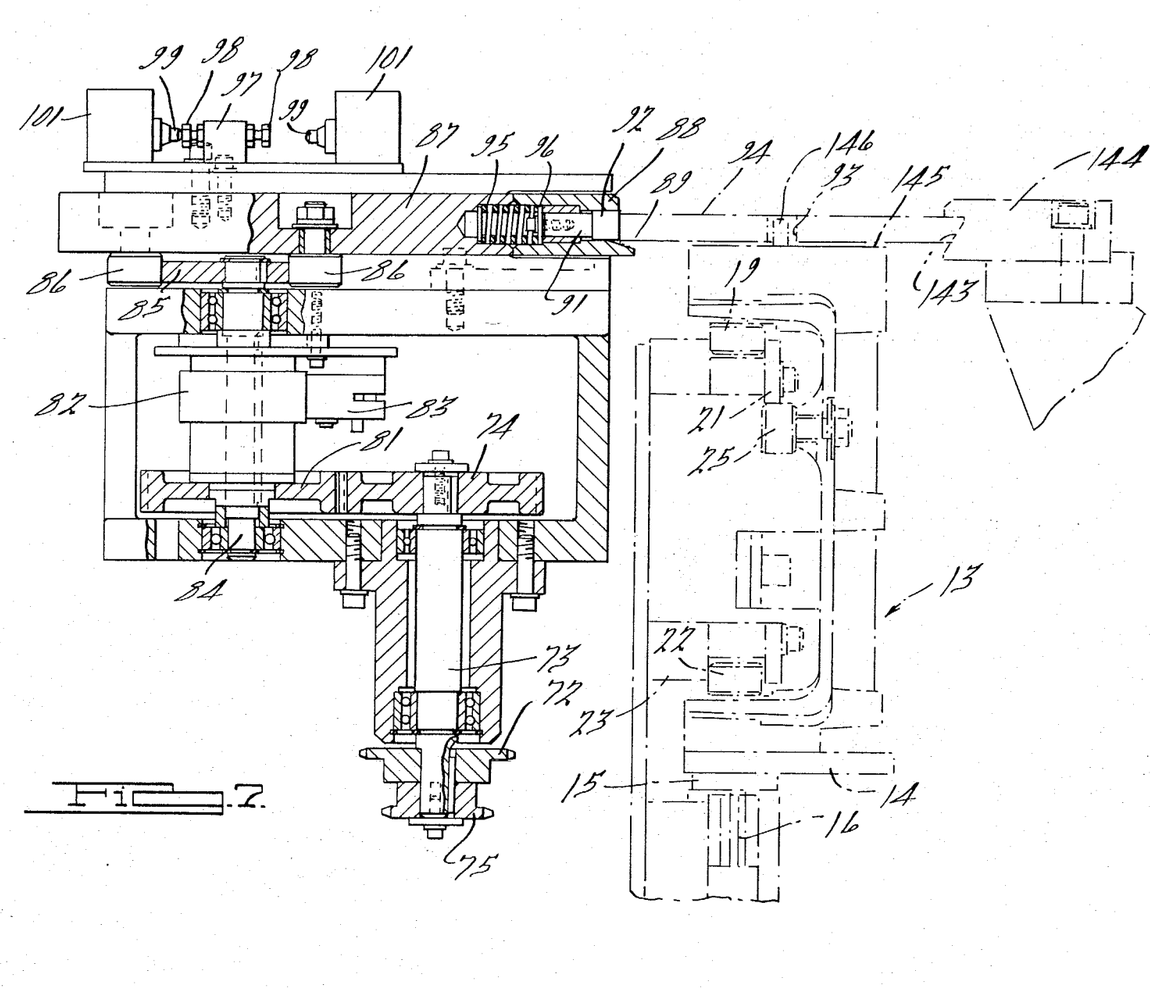
FIG. 7 is a sectional view of the clamping mechanism illustrated in FIG. 6.

Referring more specifically to FIGS. 5 and 6, a shaft extension 151 of the drive shaft 152 is supported in a pillow block bearing 153 providing an outboard support therefor. The drive for the machine embodies a motor 67 which drives through a reduction gear unit 68, such as a cone worm drive, for driving a sprocket wheel 69 through an adjustable overload clutch 150 which operates a switch 154 when actuated, to cut off the current to the motor 67 to stop the machine. The sprocket wheel 69 drives a chain 71 which drives a sprocket wheel 72 for driving a shaft 73 and gear 74, as illustrated in FIG. 7. A sprocket 75 on the shaft 73 drives a chain 76 which drives a sprocket wheel 77 on a shaft 80. Idler sprockets 78 are adjustably mounted on brackets 79 to take up any slack in the chains. The gear 74 drives a gear 81 which drives through a one-half revolution clutch 82 when operated by a solenoid 83 to rotate a bearinged shaft 84 one-half turn to drive a cam 85 through 180°. The face of the cam engages rollers 86 for advancing or retracting a clamping plate 87 each time the one-half revolution clutch 82 is engaged.

The plate 87 carries a clamping block 88 which has a sloping lip 89 and spring pressed plunger 91. The plunger has a head 92 with one or both vertical faces tapering to enter a tapered slot 93 which is provided in the edges of a pallet 94. A spring 95 urges the plunger forwardly to a degree limited by a washer 96. The clamping plate 87 carries a boss 97 having adjustable screws 98 thereon which engage plungers 99 of control switches 101. The switches are alternately operated as the clamping plate 87 is advanced and retracted by the operation of the cam 85 upon the engagement of the one-half revolution clutch 82.

The sprocket 77 drives the vertical shaft 80 connected to a solenoid controled one-half revolution clutch 109 which drives a horizontal shaft 103 through suitable gears for operating a disc 104 which has spaced cam plates 105 and 106 on the outer faces thereof. A pillar block bearing 107 on one end of a connecting rod 108 is secured to the disc 104 and moved forwardly or rearwardly each one-half revolution of the disc controled by the one-half revolution clutch 109. The opposite end of the connecting rod 108 is joined by a pillar block 111 to a lever 112 which is secured for oscillating movement on a pivot 113 supported by a bracket 114 attached to the base of the machine. The upper end of the lever 112 is joined to a ball rod end 115 by a pivot 116. The rod end 115 is connected by an adjustable link 117 having a thread on each end to a ball rod end 118 which is secured to a pivot 120 extending outwardly from the shuttle bar 56. As the connecting rod 108 and lever 112 is advanced to the right upon the engagement of the one-half revolution clutch 109, the shuttle bar 56 moves the wear plate and carrier 13 from the position 55 illustrated in FIG. 2, into the machine station where the pallet 94 carried thereby is located in approximate machining position.

The cam-operated arm 46 is secured to the supporting bracket 33 by a pivot 119, as illustrated in FIG. 8. Substantially midway between the pivots 119 and 45 a roller 121 is supported on a pivot 122. The roller 121 tracks on the cam surface 105 and at the beginning of the 180° advancement of the disc 104 the rod 43 is pulled downwardly to rock the walking beam 28 counterclockwise to release the retained carrier so that it can be advanced. The rocking of the walking beam 28 counterclockwise blocks the next-adjacent carrier from advancing to the position 55 until the walking beam 28 is rocked clockwise. A stud 123 on the arm 33 supports one end of a spring 124 which has the other end secured to the pivot 45 for applying upward tension to the end of the cam-operated arm 46 to retain the roller 121 in engagement with the surface of the cam 105.

Figure 3:
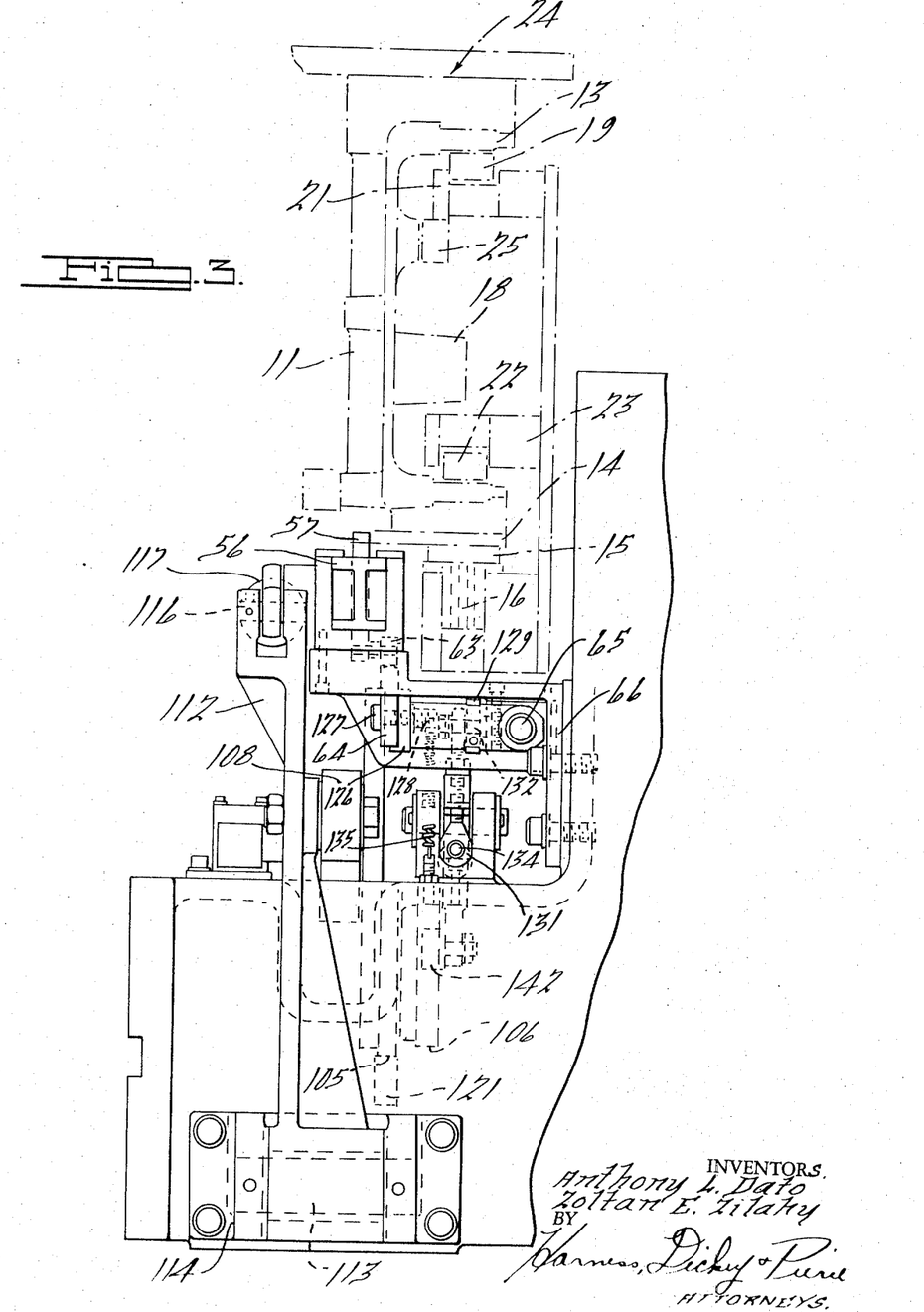
FIG. 3 is a view of the structure illustrated in FIG. 2, as viewed from the point 3 thereof.
Figure 4:
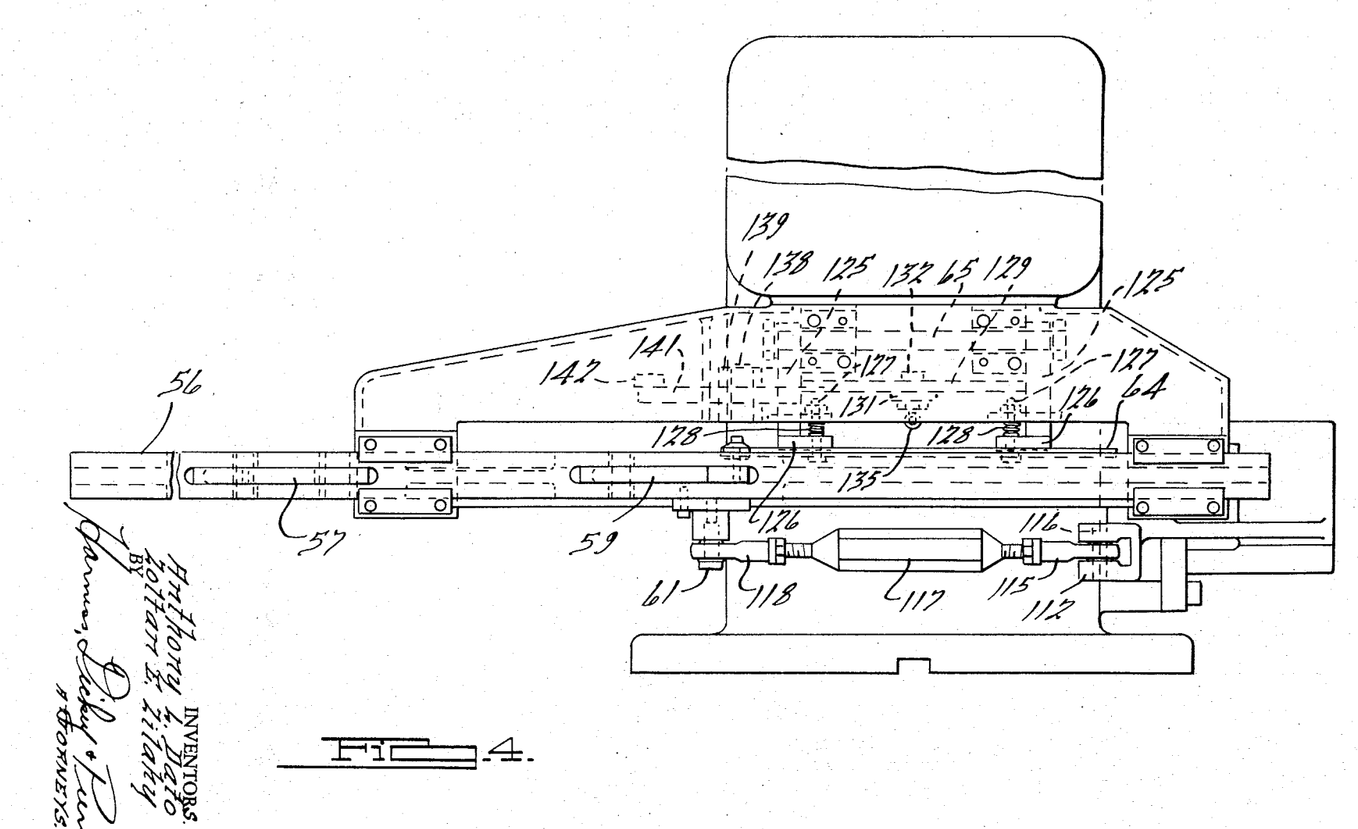
FIG. 4 is a plan view of the structure illustrated in FIG. 2, as viewed from the point 4 thereof.

As illustrated in FIGS. 2, 3 and 4, the bar 64 is mounted on a pair of spaced arms 125 which are secured to a shaft 65 pivoted to the plate 66. A pair of screws 127 are supported in blocks 126 on the ends of the arms 125 and extend through slots 130 in the bar 64. The bar is retained against the faces of the blocks 126 on ledges 70 extending outwardly from the bottom of the blocks by springs 128 on the screws 127. By pulling outwardly on the bar 64 to have it clear the ledges 70, it may be dropped downwardly out of a position of engagement with the roller 63 rendering the link 59 ineffective to stop the advancement of the wear plate 14 and its associated carrier.

A bar 129 is supported between the arms 125 and is connected at the center to one end of a rod ended link 131 by a screw 132. The opposite end of the link 131 is connected to the end of an actuating arm 133 by a screw 134. A spring 135 is connected to an eye at the end of the screw 132 and an eye of a stud 137 which is secured to the base of the machine. The opposite end of the arm 133 is secured by a pivot 138 to a supporting bracket 139 on the base of the machine. The actuating arm 133 has an angular extending operating arm 141 which has a roller 142 pivoted to the end and urged into engagement with the cam track 106 of the disc 104 by the spring 135. The movement of the arms 141 and 133 clockwise pulls the arms 125 downwardly and moves the bar 64 out of the path of engagement with the roller 63. This permits the link 59 to drop downwardly beneath the wear plate 14 out of engagement therewith upon further reciprocation of the shuttle bar 56.

Upon each revolution of the disc 104 or the two half revolutions thereof, the walking beam 28 is rocked clockwise to permit a carrier to advance to the position 55 and the bar 64 to move to the left. Thereafter the walking beam 28 is rocked counterclockwise and the shuttle bar 56 is advanced to the right with the link 59 retained in upposition by the bar 64 to move the engaged carrier into the machine station. At the same time the drive operates through the one-half revolution cam 85 to advance the clamping bar 87 to have the spring-pressed head 92 position the pallet 94 and the bar 88 transversely thereof when it moves the pallet into engagement with the clamping bar 144 which raises the pallet from the top surface 145 of the carrier. This surface is illustrated as being centrally of the carrier while, in FIG. 1, the carrier is shown with the top surface overhanging in cantilever relation to the supporting structure. When the workpiece is not to be operated on from the bottom, the central disposition of the pallet support can be employed.

The pallet is loosely mounted on the surface 145 by a pair of pins 146 which extend within opposite longitudinal aligned slots 93, the substantial clearance permitting the shifting of the pallet on the surface. The engagement of the pins extending upwardly from the carrier with the clamped pallet prevents the carrier from advancing and permits the wear plate 14 to be released by the link 59 so that the shuttle bar 56 can be returned.

The machine is controled in the usual manner by limit switches, some of which have been illustrated, to have the end of the machining operation produce the energization of the solenoid and the engagement of the one-half revolution clutch 82 to operate the cam 85 for releasing the pallet and energizing the clutch 109 which drives the disc 104 one-half revolution. This raises the bar 64 and the link 59 into engagement with the forward edge of the wear plate 14 on the carrier 13 which is released by the walking beam 28 and advanced into the machine station. This actuates the one-half revolution clutch 82 to have the pallet oriented and clamped between the clamping bars 88 and 144 which movement energizes the one-half revolution clutch 109 to rotate the disc 104 through 180° which movement drops the bar 64, operates the walking beam 28 to advance and retain a carrier and returns the shuttle bar 56 to pick up the wear plate 14 of the retained carrier. The operations are continuous and are controled by the repeated energization of the one-half revolution clutches 82 and 109. The retained carrier is released by the escapement mechanism 30 and is advanced to the machine station where the pallet is clamped in the manner pointed out hereinabove. Should a plurality of the carriers accumulate ahead of the retaining station 55 by contacting the bumpers thereon, these will be held until released seriatim by the walking beam 28 as the work is performed at the station.

As pointed out above, a shuttle bar 56 of greater length may have a pair of the sets of links 57 and 59 mounted thereon in spaced apart relation equal to the distance between the locating point 55 and the adjacent machine station. Upon each actuation of the shuttle bar, a new carrier will be delivered to the first station and the carrier of the first station will be delivered to the adjacent second station. The shuttle bar may be made of any length depending upon the length of the straight side of the machine and a number of equally spaced stations provided thereat with an equal number of links 57 and 59 mounted on the shuttle bar so that any number of carriers may be positively advanced between the stations each advancement of the shuttle bar 56.

In case the carriers are not to be advanced by the shuttle bar, the bar 64 can be pulled out and dropped down, as pointed out above, to a position out of engagement with the roller 63 on the link 59. The walking beam 28 can be pivoted out of the position of engagement with the bars 26 to permit the carriers to be advanced solely by the wear plates on the driven chain. The carriers may then be controlled by brake mechanism in the manner disclosed in the above mentioned application. After the workpiece has had all of the machining operations performed thereon at the various stations, it is removed at the next adjacent station thereahead and a workpiece to be machined is secured to the pallet by the locating and clamping mechanism provided thereon.

We claim:

1. In a control mechanism for a pallet advancing machine, a base supporting structure, a continuously driven horizontal chain on said structure having wear plates thereon, means for driving said chain, a plurality of nonsynchronous driven carriers supported on said structure having a wear plate in engagement with the wear plates on the chain by which the carriers are advanced in different spaced relation, a reciprocal shuttle bar having means thereon for engaging the wear plate of a carrier, and drive means for reciprocating said shuttle bar for advancing the carrier wear plate and the carrier into a machine station independently of the wear plates on the chain which continued to advance.

2. In a control mechanism as recited in claim 1, wherein means is provided for stopping and retaining a carrier ahead of a station in position to have the wear plate thereof engaged by the engaging means of the shuttle bar.

3. In a control mechanism as recited in claim 2, wherein the means on the shuttle bar for engaging the wear plate of a carrier is a pair of spaced pivoted links one of which engages the rear edge of the carrier wear plate the other of which engages the forward edge thereof.

4. In a control mechanism as recited in claim 3, wherein means are provided for lowering said other pivoted link to permit it to be returned beneath said wear plate by said shuttle bar.

5. In a control mechanism as recited in claim 4, wherein said lowering means embodies a movable bar, and means for moving said bar from raised position for releasing said other pivoted link.

6. In a control mechanism as recited in claim 5, wherein the movable bar has a tiltable support on which it is retained on ledge means by spring pressed pins through slots therein in position to be pulled outwardly from the ledge means and moved downwardly to render it ineffective in all positions.

7. In a control mechanism as recited in claim 2, wherein the means for stopping and retaining a carrier ahead of a station is an escapement mechanism having a walking beam mounted on a hinge on a pivot on which the beam rocks so that it can be moved out of carrier engaging position rendering the escapement mechanism ineffective.

8. In a control mechanism as recited in claim 7, wherein bumper means on the carriers space them apart when in engagement to permit the walking beam to extend in the space therebetween to retain the engaged carriers stationary as the formost carrier is released.

9. In a control mechanism as recited in claim 1, wherein an orienting and clamping mechanism is provided at the machine station for orienting and clamping a pallet above the carrier at the station when advanced thereto.

10. In a control mechanism as recited in claim 9, wherein the pallet has a notch at one side edge, pins on the carrier extending through the pallet so arranged as to permit the shifting of the pallet longitudinally and laterally relative to the horizontal support on the carrier when being oriented and clamped at the station.

11. In a control mechanism as recited in claim 10, wherein the clamping of the pallet and the engagement by pins therewith retains the carrier from being advanced by the chain drive so that the shuttle bar can be released from the wear plate thereof and returned to engage the wear plate of a carrier next to be advanced.

12. In a control mechanism as recited in claim 9, wherein a cam actuates the clamping mechanism to clamped and released positions each one-half turn thereof, a drive for said cam, and a half revolution clutch in the drive for rotating the cam through 180° each time the clutch is actuated.

13. In a control mechanism as recited in claim 1, wherein said reciprocal shuttle bar has a pivoted lever pivoted thereto, a connecting rod pivoted to said pivoted lever, a disc for reciprocating said connecting rod, and means for driving said disc in rotation.

14. In a control mechanism as recited in claim 1, wherein means are provided on the shuttle bar for engaging the wear plate of a carrier embodying a pair of spaced pivoted links one of which engages the rear edge of the carrier wear plate the other of which engages the forward edge thereof, a bar engageable with said other pivoted link to move it to raised and lowered positions, a second cam means mounted on said drive disc, and mechanism actuated by said second cam means for raising and lowering said bar and said other pivoted link to and from engagement with the forward end of said carrier wear plate.

* * * * *